United States Patent [19]

Youngquist

[11] Patent Number: 5,008,765
[45] Date of Patent: Apr. 16, 1991

[54] METHOD AND APPARATUS FOR READING OR WRITING ON TAPE USING A SERVO POSITIONED MULTIPLE CHANNEL HEAD

[75] Inventor: Robert J. Youngquist, White Bear Lake, Minn.

[73] Assignee: Minnesota Mining and Manufacturing Company, St. Paul, Minn.

[21] Appl. No.: 298,186

[22] Filed: Jan. 17, 1989

[51] Int. Cl.$^5$ .......................... G11B 5/584; G11B 5/29
[52] U.S. Cl. .................. 360/77.12; 360/121; 360/78.02
[58] Field of Search .............. 360/63, 61, 62, 121, 360/75, 77.01, 77.07–77.16, 78.01, 78.02

[56] References Cited

U.S. PATENT DOCUMENTS

| | | | |
|---|---|---|---|
| 4,149,198 | 4/1979 | Behr et al. | 360/77.07 |
| 4,462,053 | 7/1984 | Lum et al. | |
| 4,498,129 | 2/1985 | Valazquez | |
| 4,647,994 | 3/1987 | Irwin et al. | |
| 4,750,067 | 6/1988 | Gerfast | |
| 4,903,151 | 2/1990 | Mizukami et al. | 360/78.01 |

OTHER PUBLICATIONS

IBM TDB, vol. 14, No. 7, "Interleaved Multielement Magnetic Heads", Stenning, 12/71, p. 2129.
IBM TDB, vol. 15, No. 4, "Servo Control of Multielement Magnetic Heads", Zimmerman et al., 9/72, pp. 1320–1321.
IBM TDB, vol. 25, No. 2, "Re-Recordable Servo System for Multi-Track Tape", Schwarz, 7/82, pp. 778–779.
"Serial Recorded Magnetic Tape Mini-Data Cartridge for Information Interchange," Irwin Magnetics, Jun. 13, 1988.

Primary Examiner—Vincent P. Canney
Assistant Examiner—Steven R. Garland
Attorney, Agent, or Firm—Gary L. Griswold; Walter N. Kirn; William B. Barte

[57] ABSTRACT

Disclosed is a method for reading or writing data on a tape which has a plurality of data tracks and at least a first dedicated servo track. A multiple channel head with at least three channels, each having at least one element for reading or writing, is used to access the tracks on the tape. The head is moved proximate one of a plurality of predetermined positions. The channels are located so that, in any one predetermined position of the head, one channel accesses the center of a dedicated servo track on the tape and at least two other channels will access the center of distinct data tracks. Depending on the predetermined position of the head, different channels will access a dedicated servo track. The position information on a dedicated servo track is used to move the head to one of the predetermined positions once the head has been moved proximate that predetermined position.

21 Claims, 2 Drawing Sheets

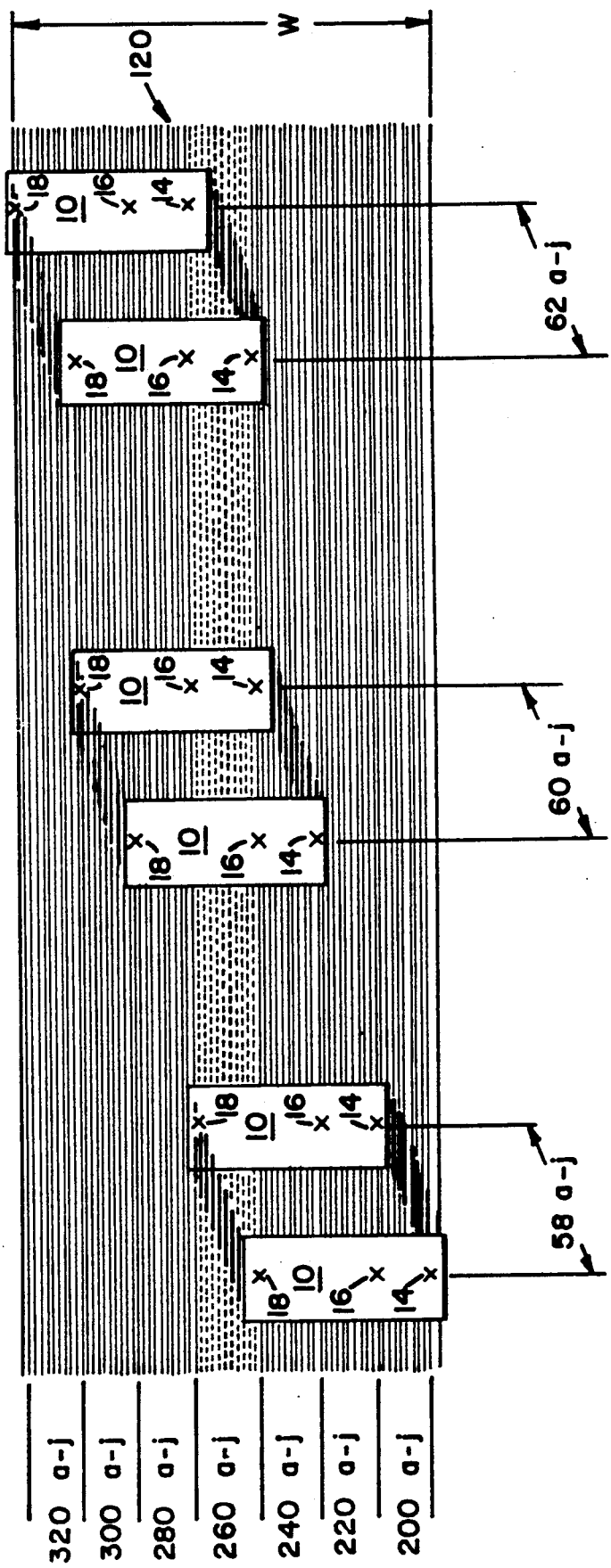

METHOD AND APPARATUS FOR READING OR WRITING ON TAPE USING A SERVO POSITIONED MULTIPLE CHANNEL HEAD

BACKGROUND OF THE INVENTION

1. Field of the Invention

The present invention relates to a method for reading or writing data on magnetic tape using a multiple channel head which is transversely movable with respect to the recording tape. The present invention also relates to magnetic head mechanisms, particularly with respect to a multiple channel head controlled by a servoing system.

2. Description of the Prior Art

Data recording cartridges containing magnetic tape and recorders adapted for their use are disclosed and claimed in U.S. Pat. No. 3,692,225 (von Behren). The recorders adapted to use such data cartridges originally employed fixed multitrack heads for accessing the tracks on the magnetic tape in the data cartridge. These fixed, multitrack heads were complex, expensive and difficult to maintain in proper alignment.

To eliminate the multitrack heads, U.S. Pat. No. 4,313,143 (Zarr) disclosed a head positioning mechanism by which a single track head could be transversely positioned with respect to the width of a magnetic tape having a plurality of parallel tracks. The system disclosed in Zarr works satisfactorily but a different system was needed when the data cartridges and recorders were miniaturized. The type of head positioning mechanism which works satisfactorily in a smaller recorder is disclosed in U.S. Pat. No. 4,750,067 (Gerfast). Gerfast uses a stepper motor to accurately move the head in a direction transverse to the tape.

Even with the head positioning mechanism of Gerfast, the number of tracks on the magnetic tape which can be accessed by a head is limited by the accuracy of head positioning possible with a stepper motor system and the variability of tape position within a cartridge as the tape crosses the head.

SUMMARY OF THE INVENTION

To increase the number of tracks on a magnetic tape which can be accurately accessed, and hence to increase the amount of data which can be stored on a tape, the present invention employs a multiple channel head which is servo positioned by having one of the head channels access a dedicated servo track containing position information on the magnetic tape, thus accurately positioning at least two other channels of the head on data tracks for reading or writing data.

In one embodiment, the present invention is directed to a method for reading or writing data on a tape which ha a plurality of parallel, longitudinally extending sections along which tracks of data may be recorded and reproduced, and along one of which sections is located at least a first dedicated servo track containing prestored position information. All of the sections are adjacent each other and have the same, predetermined width. A multiple channel head having at least three channels is also provided, in which each channel has at least one element for reading data from or writing data on the tracks on the tape. The respective channels are transversely located with respect to each other, the center-to-center distance ($D_1$) between two of the channels being equal to the center-to-center distance between adjacent corresponding sections on the tape on which data is to be written and reproduced, while the center-to-center distance ($D_2$) between a third channel and the adjacent other channel is equal to twice the center-to-center distance ($D_1$) between the other two channels. Each channel has at least one element for reading data from or writing on the tracks on the tape when the head is moved proximate one of a plurality of predetermined positions. Depending on the predetermined position of the head, different channels will access a dedicated servo track. The position information on a dedicated servo track is used to controllably transversely position the head proximate to one of the predetermined positions, one of the channels thereby always being positioned to reproduce the prestored position information while the other channels access the additional sections of the tape along which the data tracks may be located.

The method particularly further comprises controllably positioning the head such that one of the channels thereof is proximate the dedicated servo track, reproducing servo data from that track, and responding to the reproduced servo data for continuously repositioning the head such that one of the channels thereof is maintained at the center of the dedicated servo track.

It must be understood that until information is actually recorded, a track as such does not exist; there can only be said to be a potential track location. Notwithstanding, for the sake of convenience and as unrecorded magnetic recording media are commonly so described, unrecorded media may from time-to-time be referred to herein as having data tracks thereon.

BRIEF DESCRIPTION OF THE DRAWINGS

The present invention will be more thoroughly described with reference to the accompanying drawings, wherein like numbers refer to like parts in the several views, and wherein:

FIG. 3 is a diagrammatical view of a multiple channel head in varying positions with respect to magnetic tape having seventy tracks.

DETAILED DESCRIPTION OF THE PREFERRED EMBODIMENT

Figure 1:
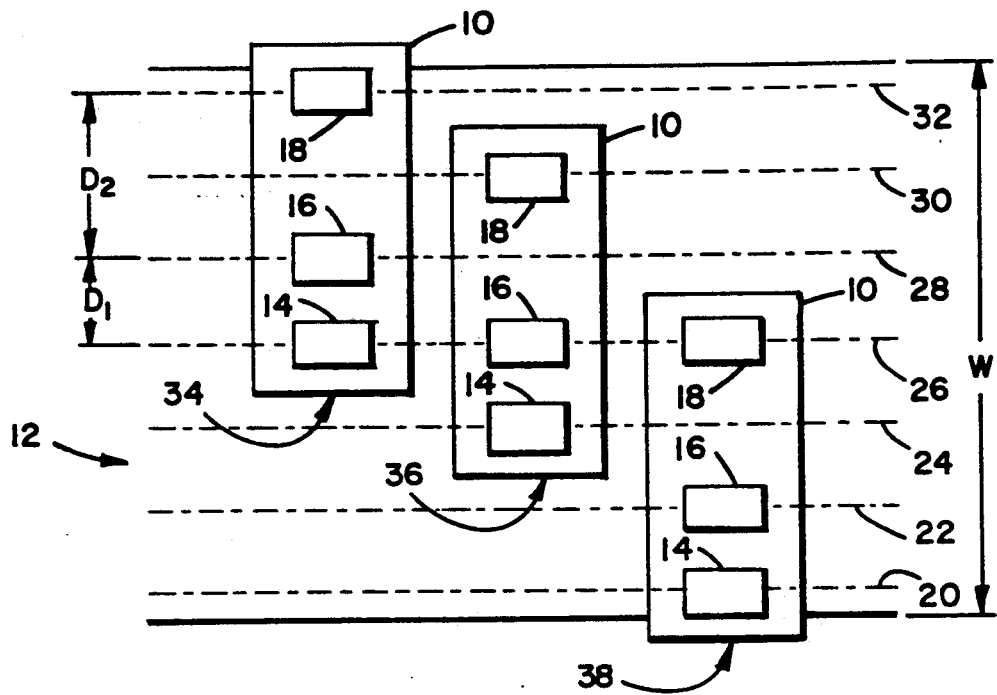
FIG. 1 is a diagrammatical view of a multiple channel head in varying positions with respect to magnetic tape having seven tracks.

FIG. 1 is a diagrammatical view of a multiple channel head, generally indicated as 10, accessing a multitrack tape, generally indicated as 12, in three different positions, 34, 36 and 38. Head 10 has three channels, generally indicated as 14, 16 and 18. Channels 14, 16 and 18 each have at least one element on the side that faces the tape that can be used to access tracks 20, 22, 24, 26, 28, 30 and 32 on tape 12 to read data from the tracks or write data on the tracks. Head 10 is movable in a direction transverse to the length of tape 12. Track 26 is a dedicated servo track containing prestored position information. Tracks 20, 22, 24, 28, 30 and 32 are data tracks on which data can be magnetically stored. All the tracks on tape 12 run in the direction of the length of tape 12 and are substantially parallel to each other and substantially equally spaced across the width W of tape 12. Tape which is generally known in the industry as quarter-inch tape is provided in the preferred embodiment. The actual width of quarter-inch tape is approximately one quarter inch, although it is not exactly one quarter inch.

As seen in FIG. 1, the spacing between channels 14 and 16 on head 10 is equal to the distance $D_1$ between adjacent tracks on tape 12. The distance $D_2$ between channels 16 and 18 on head 10 is equal to twice the distance between adjacent tracks on tape 12 so that $D_2=2D_1$.

FIG. 1 shows head 10 in three different positions 34, 36 and 38, with respect to tape 12. Positions 34, 36 and 38 are shown in a lateral direction for clarity even though head 10 only moves in a direction transverse to the length of tape 12. In position 34, channel 14 accesses the center of dedicated servo track 26 and channels 16 and 18 access the center of data tracks 28 and 32, respectively. When head 10 is in position 36, channel 16 accesses the center of dedicated servo track 26 and channels 14 and 18 access the center of data tracks 24 and 30, respectively. When head 10 is in position 38, channel 18 accesses the center of dedicated servo track 26 and channels 14 and 16 access the center of data tracks 20 and 22, respectively. The spacing of channels 14, 16 and 18 on head 10 is such that for each position 34, 36 and 38, two distinct data tracks are accessed. Thus, all of the data tracks on tape 12 can be accessed by using just one dedicated servo track and just three different head positions.

The method of reading or writing data according to the present invention can now be more fully explained. Data can be read from or written on tape 12 by moving head 10 in a direction transverse to the length of tape 12 proximate one of positions 34, 36 or 38. If head 10 is moved proximate position 34, for example, channel 14 is proximate dedicated servo track 26. Channel 14 reads the position information that has been prestored on dedicated servo track 26 and uses this information to determine the error between the present position of head 10 and position 34 of head 10. This error information is then used to accurately position channel 14 on the center of dedicated servo track 26, thus accurately positioning channels 16 and 18 on the center of data tracks 28 and 32, respectively. Thus, data can be written on or read from any data track on tape 12 by moving head 10 proximate the position where a channel on head 10 accesses that track.

A variety of configurations of channel elements for reading and writing could be used. For example, each channel could have one element that both reads and writes; each channel could have one read element and one write element; each channel could have, in order, a read element, a write element and another read element; or each channel could have, in order, a write element, a read element, and another write element.

Figure 2:
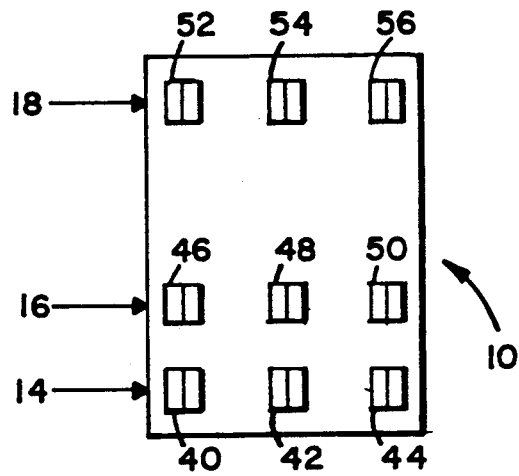
FIG. 2 is a diagrammatical view of the preferred embodiment of the side of the multiple channel head of FIG. 1 facing the magnetic tape.

FIG. 2 is a diagrammatical illustration of the preferred embodiment of the side of head 10 which faces tape 12 and shows channels 14, 16 and 18 in more detail. Channel 14 is shown at the bottom of head 10 and comprises read element 40, write element 42 and read element 44 spaced apart along the length of the tape. Channel 16 is shown above channel 14 and comprises read element 46, write element 48 and read element 50 spaced apart along the length of the tape. Channel 18 is shown at the top of head 10 and comprises read element 52, write element 54 and read element 56 spaced apart along the length of the tape. Read elements 40, 44, 46, 50, 52 and 56 are magnetic heads configured to read data that has been magnetically stored on tape. Write elements 42, 48 and 54 are magnetic heads that are configured to magnetically store data on magnetic tape. The preferred order of read element, write element and read element on each channel allows data to be confirmed once it has been written on a tape regardless of the direction the tape is moving. Read elements 40, 46 and 52 are in a line perpendicular to the tape path, write elements 42, 48 and 54 are in second line perpendicular to the tape path and read elements 44, 50 and 56 are in a third line perpendicular to the tape path.

FIG. 3 is a diagrammatical illustration of the preferred embodiment of the invention. In the preferred embodiment, tape 120 is provided with seventy tracks, as opposed to the seven tracks shown in FIG. 1. For the purpose of explaining FIG. 3, each of the track areas shown in FIG. 1 can be thought of as a section in FIG. 3. For example, referring to FIG. 3, section 200 corresponds to the area around track 20 in FIG. 1. In a similar manner, sections 220, 240, 260, 280, 300 and 320 shown in FIG. 3 correspond to the areas around tracks 22, 24, 26, 28, 30, and 32, respectively. It can be seen from FIG. 3 that each section has 10 tracks, a–j, in each section. The 10 tracks in section 200 are referred to as 200a–200j. The tracks in the rest of the sections are similarly numbered. All the tracks run in the direction of the length of tape 120 and are substantially parallel to each other and substantially equally spaced across the width W of tape 120. Just as track 26 in FIG. 1 was a dedicated servo track, tracks 260a–260j in FIG. 3 are all dedicated servo tracks containing prestored position information. The tracks in sections 200, 220, 240, 280, 300 and 320 are all data tracks on which data can be stored.

The channel locations on head 10 in FIG. 3 are the same as shown in FIG. 1 but can be described differently with respect to FIG. 3. Focusing on FIG. 3, the spacing between channels 14 and 16 can be described as equal to the width of a section on tape 120. Furthermore, it can be seen from FIG. 3 that the spacing between channels 16 and 18 can be defined as twice the width of a section on tape 120. This spacing allows for the efficient and accurate accessing of data tracks on tape 120.

Head 10 is shown in thirty different positions, 58a–58j, , 60a–60j, , and 62a–62j, with respect to tape 120 in FIG. 3. The positions are shown in a lateral direction for clarity even though head 10 only moves in a transverse direction with respect to tape 120. In each of the positions of head 10 shown in FIG. 3, one of channels 14, 16 or 18 is centered on one of dedicated servo tracks 260a–60j and the other two channels are centered on distinct data tracks. In head 10 positions 58a–58j, channel 18 accesses dedicated servo tracks 260a–260j, respectively, and channels 14 and 16 access datatracks 200a–200j and 200a–220j, respectively. In head positions 60a–60j, , channel 16 accesses dedicated servo tracks 260a–260j, respectively and channels 14 and 18 access datatracks 240a–240j and 300a–300j, respectively. In head 10 positions 62a–62j, channel 14 accesses dedicated servo tracks 260a–260j, respectively, and channels 16 and 18 access data tracks 280a–280j and 320a–320j, respectively.

As explained above, it is the spacing of channels 14, 16 and 18 on head 10 which allows for the efficient accessing of 60 data tracks with just 10 servo tracks. As can be seen in FIG. 3, since two unique data tracks are accessed for each combination of channel and dedicated servo track, only 30 different positions of head 10 are necessary to access all 60 data tracks on tape 120.

The method for using the system diagrammatically shown in FIG. 3 is similar to the method disclosed with respect to FIG. 1. Namely, head 10 is moved proximate one of the positions 58a–58j, 60a–60j, and 62a–62j shown in FIG. 3. The channel that is proximate a dedicated servo track in that position reads the position information prestored on that dedicated servo track and uses the information to reposition the head such that the channel is centered on the dedicated servo track, thus accurately positioning the other two channels on data tracks. The two channels that have been accurately positioned on data tracks can then, with the element or elements thereon, read data from or write data on the data tracks being accessed. These steps can be repeated for all the unique combinations of channels and dedicated servo tracks, the 30 positions of head 10 shown in FIG. 3, to read data from or write data on any data track on tape 120.

Figure 4:
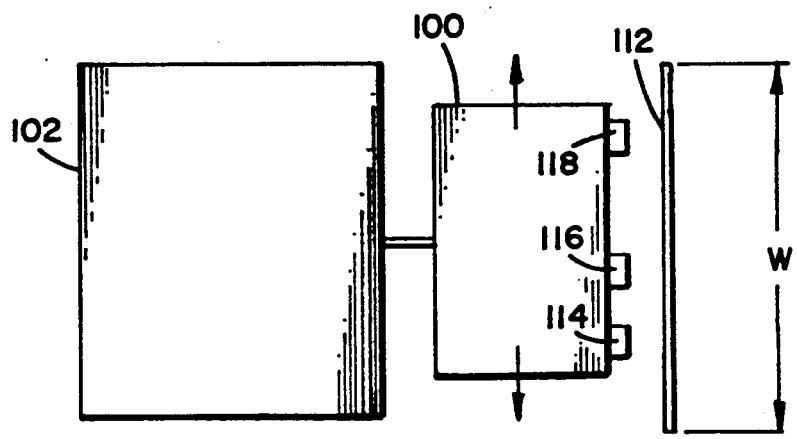
FIG. 4 is a side elevational block diagram of a servo positioned multiple channel head and magnetic tape system.

A block diagram of the apparatus invention is shown in FIG. 4 along with tape 112. Head 100 is movable in the direction of the arrows shown on head 100 by head positioning mechanism 102. Channels 114, 116 and 118 are located on head 100 in the same relationship with respect to tape 112 as disclosed above for channels 14, 16 and 18 with respect to head 10 and tape 12. Head positioning mechanism 102 could be the type shown in U.S. Pat. No. 4,750,067 (Gerfast) with the exception that head positioning mechanism 102 would be servo controlled in a manner well known in the art.

Thus, data tracks on tape 112 would be accessed by head positioning mechanism 102 moving head 100 to a position where one of channels 114, 116 and 118 was proximate a dedicated servo track on tape 112. One of the read elements on that channel would read the position information prestored on that dedicated servo track. This information would be used to calculate the error between the present position and the position where the channel would be centered on the dedicated servo track. Head positioning mechanism 102 would then move head 100 such that the channel is centered on the dedicated servo track which would accurately position the other two channels on data tracks. The two channels accessing data tracks could then, with the elements thereon, read data from or write data on the data tracks.

Although the preferred embodiment of the present invention includes a magnetic tape having 60 data tracks and 10 dedicated servo tracks and a multiple channel head having three channels, it is to be understood that a tape with different numbers of data tracks and dedicated servo tracks and/or a head with a different number of channels could be used. For instance, with very few changes, the preferred embodiment could be modified so that the tape had more or less than 70 total tracks as long as the ratio of data tracks to dedicated servo tracks was 6 to 1. For example, a tape could have 5 dedicated servo tracks and 30 data tracks. In this embodiment, the 3-channel head disclosed above could access the 30 data tracks by moving the head to 15 unique positions where each position is defined by a unique combination of channel and dedicated servo track.

It is also to be understood that other modifications could be made and that all such modifications falling within the spirit and scope of the appended claims are intended to be included in the present invention.

I claim:

1. A method of reading or writing data on tape, comprising:
   providing a tape having a plurality of parallel, longitudinally extending sections along which tracks of data may be recorded and reproduced, and along one of which sections is located at least a first dedicated servo track containing prestored position information, all said sections being adjacent to each other and having the same predetermined width;
   providing a multiple channel head having at least three channels, the center-to-center distance between at least two of the channels being equal to the center-to-center distance between adjacent sections, and the center-to-center distance between a third channel and the closest of the other channels being equal to twice the center-to-center distance between said adjacent sections, for accessing at each of a limited number of predetermined positions said dedicated servo track and at least one of said sections along which data may be recorded and reproduced each channel having at least one element for reading data from or writing data on the tape; and
   using the position information on a dedicated servo track to controllably transversely position the head proximate to one of the predetermined positions, one of said channels thereby always being positioned to reproduce said prestored position information while the other channels access said additional sections along which data tracks may be located.

2. The method according to claim 1, wherein the multiple channel head is provided with three channels.

3. The method according to claim 1, wherein the using step comprises:
   using the position information to determine the error between the position of the head and the one predetermined position; and
   using the error information to continuously reposition the head such that one of the channels thereof is maintained at the center of the servo track.

4. The method according to claim 1 wherein the tape is provided with the first dedicated servo track as one of a plurality of dedicated servo tracks, the tape further being provided with a ratio of six sections containing data tracks for each section containing dedicated servo tracks.

5. The method according to claim 4, wherein the tape is provided with 60 data tracks and 10 dedicated servo tracks.

6. The method according to claim 1, wherein quarter-inch tape is provided.

7. A method according to claim 1, comprising providing a said tape with each of said sections being sufficiently wide to contain a predetermined number of tracks, a said predetermined number of servo tracks being recorded within a midway located section, and a said predetermined number of data tracks being located along each of the other sections.

8. A method according to claim 1, comprising providing the tape with each of said sections being substantially one track wide, one servo track being recorded within a midway located section and one data track being located within each of the other sections.

9. A method according to claim 1, comprising providing said multiple channel head with three channels, each having at least one read and one write element, and by providing the tape with seven sections, the center such section containing servo tracks, whereby by positioning said head at one of said predetermined locations, one of said channels will always be positioned to access a servo track and the other channels will always be located to access data track sections.

10. A method of reading or writing data on tape, comprising:
providing a tape having seven sections comprising six data sections, each data section comprising at least one data track for storing data and a dedicated servo section comprising at least one dedicated servo track containing prestored position information, the dedicated servo section being located in the middle of the six data sections on the tape so that there are three data sections on each side of the dedicated servo section, each data section and the dedicated servo section comprising an equal number of tracks;
providing a multiple channel head having first, second and third channels for accessing the tracks on the tape with each channel having at least one element for reading data from or writing data on the tape, the channels being spaced apart on the head in a direction transverse to the length of the tape with the spacing between the first and second channels being equal to the width of a tape section and the spacing between the second and third channels being equal to twice the width of a tape section;
positioning the head with respect to the tape so that one of the channels is proximate one of the dedicated servo tracks in the dedicated servo section; and
using the position information stored on the one dedicated servo track to move the head so the one channel proximate the one dedicated servo track is centered on the one dedicated servo track and so that the other two channels are accessing two distinct data tracks, whereby all the data tracks in the six data sections can be accessed by selectively positioning the head so that one by one each of the three channels is proximate each one of the dedicated servo tracks in the dedicated servo section.

11. The method according to claim 10 wherein the tape is provided with each of the seven sections comprising ten tracks.

12. The method according to claim 10 wherein the using step comprises:
reading the position information from the one dedicated servo track with the channel that is proximate the one dedicated servo track;
using the position information to determine the error between the position of the head and the one dedicated servo track; and
using the error information to move the head so the channel that is proximate the dedicated servo track is centered on the one dedicated servo track.

13. The method according to claim 10 wherein quarter-inch tape is provided.

14. A method of reading or writing data on tape, comprising:
providing a tape having first, second, third, fourth, fifth, sixth and seventh sections in that order wherein the first, second, third, fifth, sixth and seventh sections each comprise at least one data track for storing data and the fourth section comprises at least one dedicated servo track containing prestored position information, each data section and the dedicated servo section comprising an equal number of tracks;
providing a multichannel head having first, second and third channels for accessing the tracks on the tape with each channel having at least one element for reading data from or writing data on the tape, the first, second and third channels being spaced apart on the head in that order in the direction of the first to the seventh track on the tape with the spacing between the first and second channels being equal to the width of a tape section and the spacing between the second and third channels being equal to twice the width of a tape section;
positioning the head proximate one of a number of predetermined positions, the number of predetermined positions being determined by multiplying the number of tracks in each section by three, a unique combination of channel and dedicated servo track existing for each predetermined position, the predetermined positions falling into three groups, the first group having the first channel accessing the center of dedicated servo tracks in the dedicated servo section and the second and third channels simultaneously accessing the center of data tracks in the fifth and seventh data sections, respectively, the second group having the second channel accessing the center of dedicated servo tracks in the dedicated servo section and the first and third simultaneously accessing the center of data tracks in the third and sixth data sections, respectively, and the third group having the third channel accessing the center of dedicated servo tracks in the dedicated servo section and the first and second channels simultaneously accessing the center of data tracks in the first and second data sections, respectively;
reading the position information from the dedicated servo track with the channel that is proximate the dedicated servo track in that predetermined position;
using the position information to determine the error between the position of the head and the predetermined position; and
using the error information to move the head to the predetermined position.

15. The method according to claim 14 wherein each of the seven sections comprises ten tracks.

16. The method according to claim 14 wherein quarter-inch tape is provided.

17. An apparatus for reading or writing data on tape, comprising:
multiple channel head means comprising a head having at least three channels for accessing tracks on a said tape, each channel having at least one element for reading data from or writing data on a said tape, the center-to-center distance between at least two of the channels being equal to the center-to-center distance between adjacent sections on a said tape having a plurality of longitudinally extending sections along which tracks of data may be recorded and reproduced and along one section of which is located at least a first dedicated servo track containing prestored position information, all sections being adjacent to each other and having the same predetermined width, and the center-to-center distance between the third channel and the closest of the other channels being equal to twice the center-to-center distance between adjacent sections on said tape, for accessing at each of a limited number of predetermined positions said dedicated servo track and at least one of said sections along which data may be recorded and reproduced, head positioning means responsive to said position information for controllably moving the head in a direction transverse to the length of a said tape to one of said predetermined positions, so that when the head is in any one of the predetermined positions, one channel accesses the center of a said dedicated servo track and at least two other channels access the center of distinct data tracks on a said tape, and so that different channels access a dedicated servo track depending on which predetermined position the head is in with respect to the tape; said head positioning means including servo means for using the position information stored on a dedicated servo track to move the head to one of the predetermined positions after the head has been moved proximate that predetermined position, and means for controlling the elements on the channels to read data from or write data on a said tape.

18. The apparatus of claim 17, wherein the receptacle is sized to receive a quarter-inch tape.

19. The apparatus of claim 17 wherein the head comprises first, second and third channels.

20. An apparatus for reading or writing data on tape, comprising:

means for receiving a tape having seven sections comprising six data sections, each data section comprising at least one data track for storing data and a dedicated servo section comprising at least one dedicated servo track containing prestored position information, the dedicated servo section being located in the middle of the six data sections so that there are three data sections one each side of the dedicated servo section, each data section and the dedicated servo section comprising an equal number of tracks;

multiple channel head means comprising a head having first, second and third channels for accessing said tracks with each channel having at least one element for reading data from or writing data on the tape, the channels being spaced apart on the head in a direction transverse to the length of said tape with the spacing between the first and second channels being equal to the spacing between adjacent tape sections and the spacing between the second and third channels being equal to twice the spacing between adjacent tape sections;

means for moving the head in a direction transverse to the length of said tape; and control means for controlling the transverse movement of the head to position a channel proximate any one of the dedicated servo tracks in the dedicated servo section, the control means including servo means for using the position information stored on the dedicated servo track to move the head from a position where a channel is proximate the dedicated servo track to a position where the channel is centered on the dedicated servo track and means for controlling the elements on the channels to read data from or write data on a said tape.

21. The apparatus of claim 20, wherein the receptacle is sized to receive a quarter-inch tape.

* * * * *